US010110699B2

(12) United States Patent
Kunjithapatham et al.

(10) Patent No.: US 10,110,699 B2

(45) Date of Patent: Oct. 23, 2018

(54) METHOD AND SYSTEM TO ENABLE MOBILE USERS TO RECEIVE PERSONALIZED NOTIFICATIONS

(71) Applicant: Samsung Electronics Co., Ltd., Suwon-si, Gyeonggi-do (KR)

(72) Inventors: Anugeetha Kunjithapatham, Millbrae, CA (US); Simon Gibbs, San Jose, CA (US)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 15/616,324

(22) Filed: Jun. 7, 2017

(65) Prior Publication Data

US 2017/0272536 A1 Sep. 21, 2017

Related U.S. Application Data

(63) Continuation of application No. 13/595,902, filed on Aug. 27, 2012.

(51) Int. Cl.

*H04L 12/58* (2006.01)
*H04W 4/12* (2009.01)
*H04W 4/20* (2018.01)
*H04L 29/08* (2006.01)
*H04W 4/21* (2018.01)

(52) U.S. Cl.

CPC ............ *H04L 67/306* (2013.01); *H04L 51/14* (2013.01); *H04W 4/12* (2013.01); *H04W 4/21* (2018.02)

(58) Field of Classification Search

CPC ....... H04L 51/24; H04L 51/12; H04L 12/587; H04M 3/436; H04M 2203/4536; H04W 4/12

See application file for complete search history.

(56) References Cited

U.S. PATENT DOCUMENTS 6,094,681 A 7/2000 Shaffer et al.
7,523,397 B2 4/2009 Cheung et al.
7,805,489 B2 9/2010 Roberts
8,064,896 B2 11/2011 Bell et al.
8,078,158 B2 12/2011 Backholm
8,116,214 B2 2/2012 Backholm et al.

(Continued)

FOREIGN PATENT DOCUMENTS

EP 1838058 A1 9/2007

OTHER PUBLICATIONS

European Examination Report dated Dec. 16, 2016 for European Patent Application No. 13181907.0 from European Patent Office, pp. 1-3, Munich Germany.

(Continued)

*Primary Examiner* — Liton Miah

(74) *Attorney, Agent, or Firm* — Sherman IP LLP; Kenneth L. Sherman; Hemavathy Perumal

(57) ABSTRACT

A customizable notification system permits a user of a mobile device to configure notification preferences for different accounts and services that the user subscribes to, such as notification from email, instant messaging, and social networks. A notification viewer on the mobile device provides an aggregated view of notifications coming from different sources, customized according to the user's preferences, such as filter preferences and delivery preferences.

20 Claims, 4 Drawing Sheets

(56) References Cited

U.S. PATENT DOCUMENTS

| | | | |
|---|---|---|---|
| 8,135,392 | B2 | 3/2012 | Marcellino et al. |
| 8,244,796 | B1 | 8/2012 | James et al. |
| 2004/0088358 | A1 | 5/2004 | Boda et al. |
| 2008/0086464 | A1 | 4/2008 | Enga |
| 2008/0272907 | A1 | 11/2008 | Bonansea et al. |
| 2010/0159995 | A1 | 6/2010 | Stallings et al. |
| 2010/0191836 | A1 | 7/2010 | Knight |
| 2011/0029989 | A1 | 2/2011 | Yach et al. |
| 2011/0060996 | A1* | 3/2011 | Alberth, Jr. ............ H04L 51/24 715/736 |
| 2012/0149342 | A1 | 6/2012 | Cohen et al. |
| 2012/0163269 | A1 | 6/2012 | Shuster et al. |
| 2012/0198053 | A1 | 8/2012 | Ozan et al. |
| 2012/0244841 | A1 | 9/2012 | Teng et al. |

OTHER PUBLICATIONS

European Search Report dated Mar. 7, 2014 for European Patent Application No. 13181907.0 from European Patent Office, pp. 1-6, Munich Germany.

* cited by examiner

METHOD AND SYSTEM TO ENABLE MOBILE USERS TO RECEIVE PERSONALIZED NOTIFICATIONS

CROSS REFERENCE TO RELATED APPLICATIONS

This application claims priority from U.S. Non-Provisional patent application Ser. No. 13/595,902, filed on Aug. 27, 2012, incorporated herein by reference.

FIELD OF THE INVENTION

The present invention is generally related to providing notifications in communication-oriented services. More particularly, the present invention is directed towards a system and method that enables users of a mobile device to customize notifications that they would like to receive from configured services, such as email, instant messaging, and social messaging.

BACKGROUND OF THE INVENTION

Support for real-time "push" notification is becoming an important feature on mobile device platforms. Consumers are using more and more communications-oriented services (such as email, Instant Messaging (IM), Short Messaging Service (SMS), Social Networking Service (SNS)) and are increasingly expecting real-time updates from these services. New platforms, such as the iPhone®, Android®, and HP Palm WebOS®, offer extensive support for real-time notifications.

There are two main approaches adopted by common platforms to support such notifications: 1) applications or widgets on the device directly poll services for notifications (e.g., new updates); and 2) remote servers, usually hosted by the platform or service provider, provide a notification "detection and forwarding" service (e.g., Apple's Push Notification Service (APNS)).

Typically, the platform or service providers decide the type and format of notifications that are made available for the mobile users to subscribe to. As a result, mobile users do not have fine grained control over the type of notifications they can receive. For example, the user is unable to specify that he is interested only in notifications from a particular friend, or about a particular post, unless this is directly supported by the service provider.

SUMMARY OF THE INVENTION

A customizable notification system permits a user of a mobile device to configure notification preferences for different accounts and services of the user that generate notifications. A notification viewer in the mobile device presents a consistent aggregated view of notifications according to the user's preferences, such as filter preferences and delivery preferences.

In one embodiment of a system, a notification monitor resides on a different device than the mobile device, such as in a home PC or home server. The notification monitor receives notification from different sources, applies the user's preferences, and then provides the aggregated notifications to the mobile device. In one implementation, the mobile device includes a notification viewer, configuration tool, and data cache to store user preferences.

In one embodiment of a method, a user configures accounts and services to be monitored, and also configures notification preferences for the aggregated accounts and services. A binding process binds the mobile device to the device performing notification monitoring. Notification monitoring is then performed and notifications are delivered to the mobile device.

DETAILED DESCRIPTION

Figure 1:
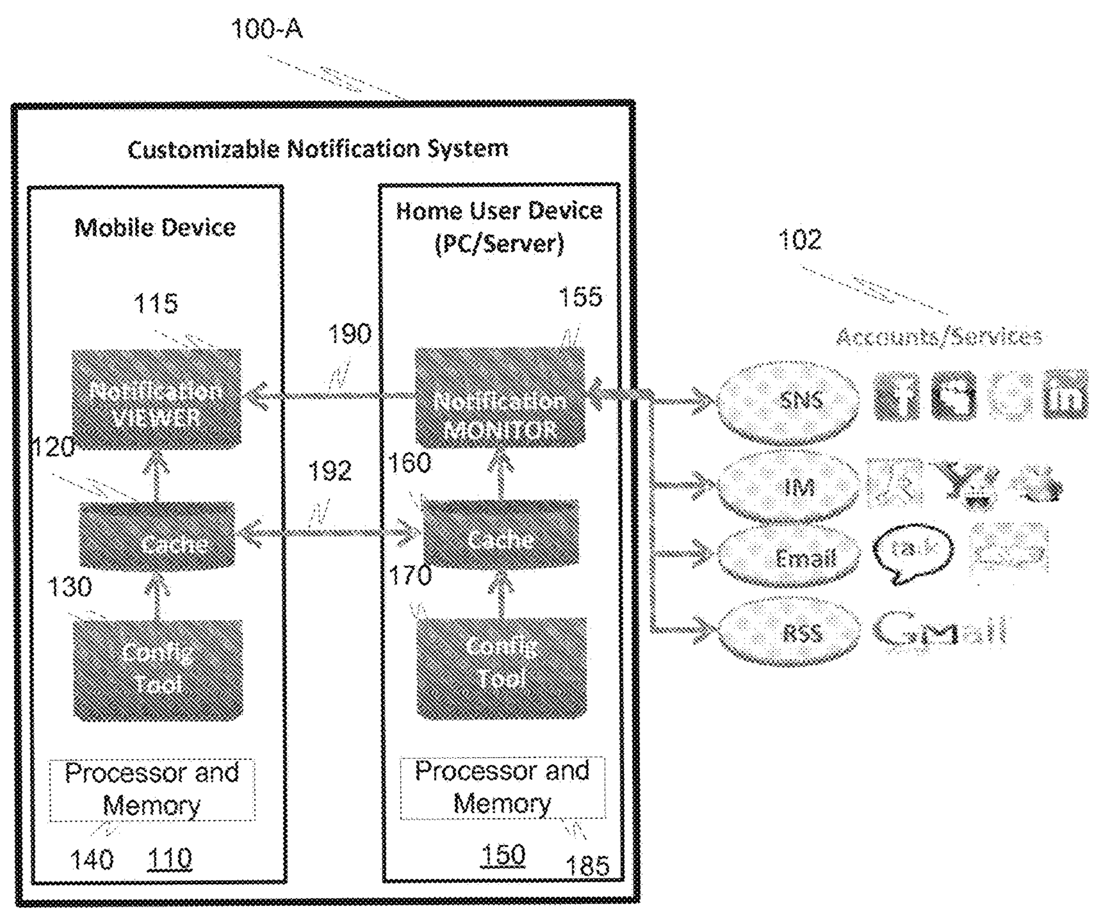
FIG. 1 illustrates a customizable notification system in accordance with an embodiment of the present invention.

FIG. 1 illustrates a customizable notification system 100-A in accordance with one embodiment of the present invention. The customizable notification system 100-A monitors the different accounts/services 102 of the user on their behalf, and forwards notifications to the user's mobile device 110, customized according to filters set by the user and delivered according to preferences set by the user. Thus, notifications from different accounts and services 102 are aggregated, filtered/prioritized according to user-preferences, and delivered based on user-defined delivery options. Examples of the types of notifications that can be customized include notifications (also known as "updates") such as email updates ("push" and conventional), Instant Messaging (IM) updates, Really Simple Syndication (RSS) updates and social networking updates (such as Facebook® and Twitter®). The customizable notification system facilitates the user with fine-grained control over the type and frequency of notifications they wish to collectively receive from various service providers and accounts on their mobile device. In one embodiment, the customizable notification system, thus, acts to:

1. monitor a set of accounts/services for notifications on behalf of the user;
2. enable users to set notification filters and preferences, to set filtering and prioritization rules, such as what type of notifications are important, what sources of notifications have preference (e.g., whether notifications from particular individuals or organizations have a greater priority), perform filtering or prioritization based on keywords or other rules, filter out redundant messages (e.g., filter redundant Twitter® feeds from different sources that have essentially identical content), and set preferences for how and when notifications should be delivered to the user's device; and
3. deliver customized, prioritized notifications to the user's mobile device according to the user's chosen filters, prioritization, and preferences.

The location of components to implement the functionality of the customization notification system 100-A depends on implementation details. In one embodiment, the customization notification system 100-A comprises a notification viewer 115 that runs on the mobile device 110; a configuration tool 130 and a cache 120 also preferably run on the mobile device 110 to permit the user to configure preferences from the mobile device. The mobile device 110 also includes hardware, such as a local processor and memory 140. As an illustrative example, the mobile device 110 may be a smart phone having a wireless communication capability.

The customizable notification system includes a notification monitor 155. It is generally desirable to reduce the consumption of resources in a mobile device. Consequently, in one embodiment, the notification monitor 155 resides on a different device 150 than the mobile device 110, which may be a home user device such as the user's PC or a home server. More generally, the notification monitor 155 could run on any device that has enough processing power and storage to run one or more agents, store account information and notifications, support a configuration tool, and communicate with the mobile device 110.

In embodiments in which the notification monitor runs on a home PC or a home server, the home PC/server has a database cache 160 to store accounts/services, filters and preferences configured by the user. This is kept in sync with the cache 120 on the mobile device. With the configuration tool 170 on a home PC, users configure accounts/services to be monitored and set their notification filters and preferences through this tool. The account configuration and preferences are stored to and retrieved from the cache 160, thereby enabling the user to change configurations on a home PC/server or the mobile device. The notification monitor 155 acts to monitor the accounts/services configured by the user, for notifications/unread updates.

The components on the mobile device 110 preferably include a local database cache 120 to store accounts/services, filters and preferences configured by the user. This is kept in sync with the cache 160 on the home PC. A local configuration tool 130 on the mobile device allows users (or "the user") to configure accounts/services to be monitored, set their notification filters and preferences through this tool. The account configuration and preferences are stored to and retrieved from the synced caches 130 and 160, thereby enabling the user to change configurations on either the home PC or the mobile device. The notification viewer 115 receives or pulls notifications from the notification monitor 190 and alerts the user about unread notifications according to the user's preferences.

The customizable notification system of FIG. 1 may be implemented in a variety of different ways, such as individual applications, background services, web apps/widgets, etc. In a preferred embodiment, they are implemented as components of a distributed notification system, as illustrated in FIG. 1.

Figure 2:
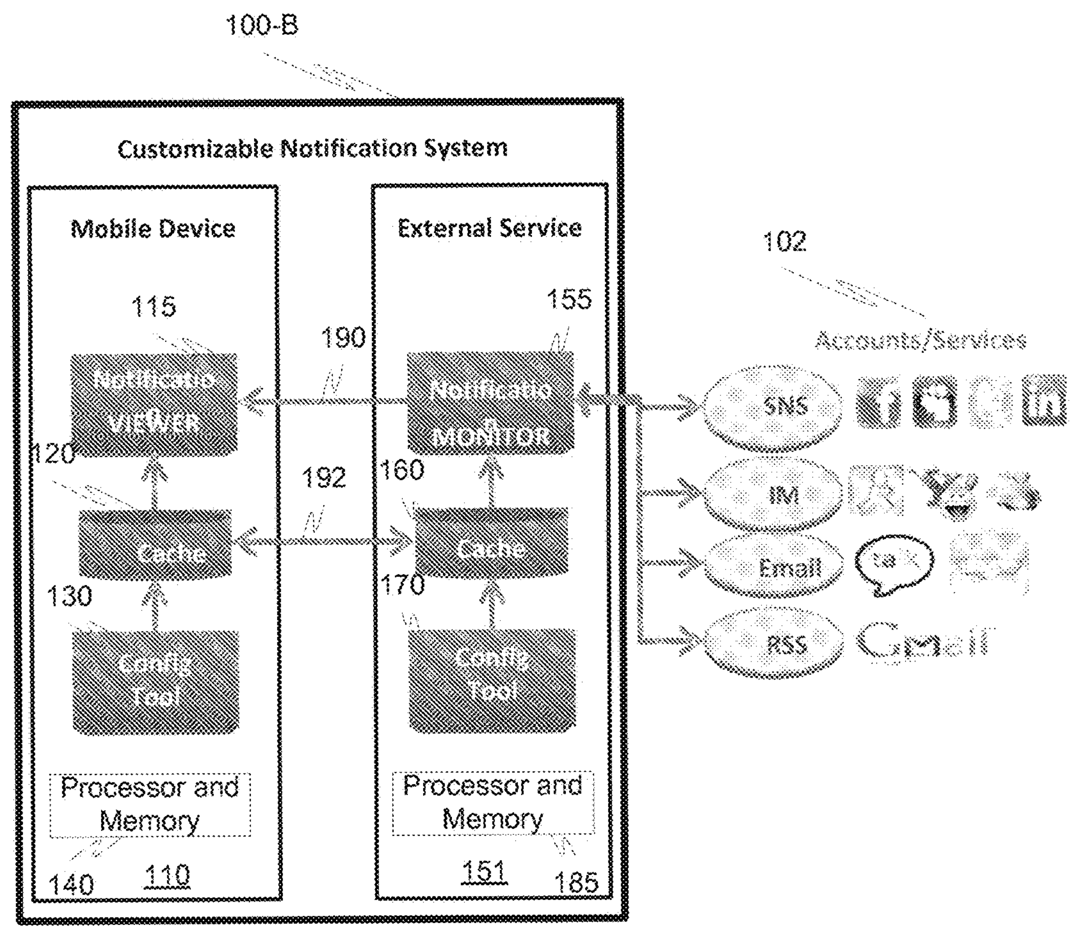
FIG. 2 illustrates a customizable notification system in accordance with an embodiment of the present invention.

Referring to FIG. 2, in one embodiment of a customizable notification, system 100-B functions performed at the home PC/server may also be performed as a general service 151. For example, the general service may be a service supported by a third party, or otherwise not requiring a user's personal computing device, such as a service supported by a web-based service, including a web server or in a cloud-based service.

Figure 3:
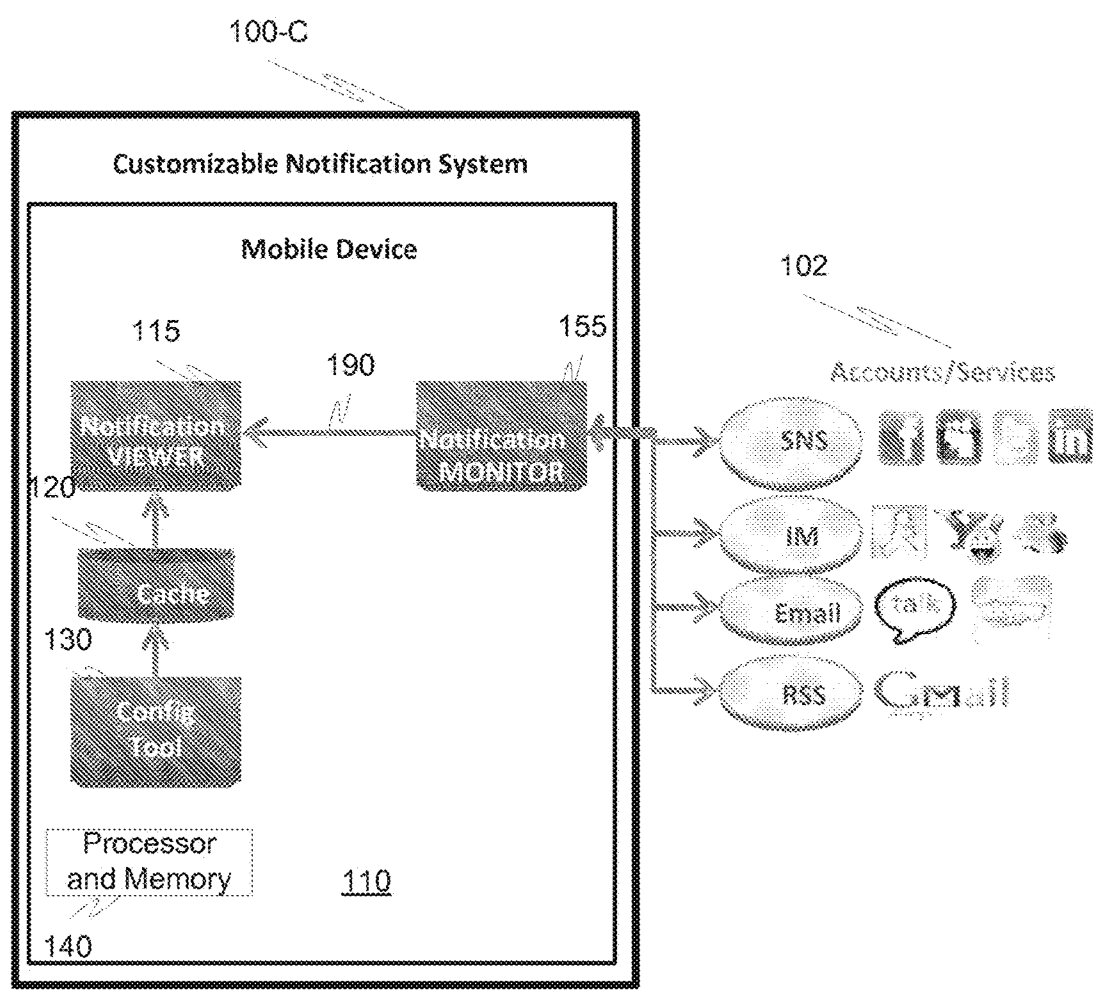
FIG. 3 illustrates a customizable notification system in accordance with an embodiment of the present invention.

Referring to FIG. 3, in principle, all of the functions of a customizable notification system 100-C may be performed on the mobile device itself, including monitoring notifications. However, this requires additional computing cycles and increases battery drain compared with having the monitor function being performed on a home PC, remote server, or other service that is external to the mobile device. However, there are some individuals who utilize a mobile device, but who do not have a personal computer or server. Consequently, the embodiment of FIG. 3, while having the previously described disadvantages, is a potential option for some users, such as those users whom do not have a home PC or server.

Figure 4:
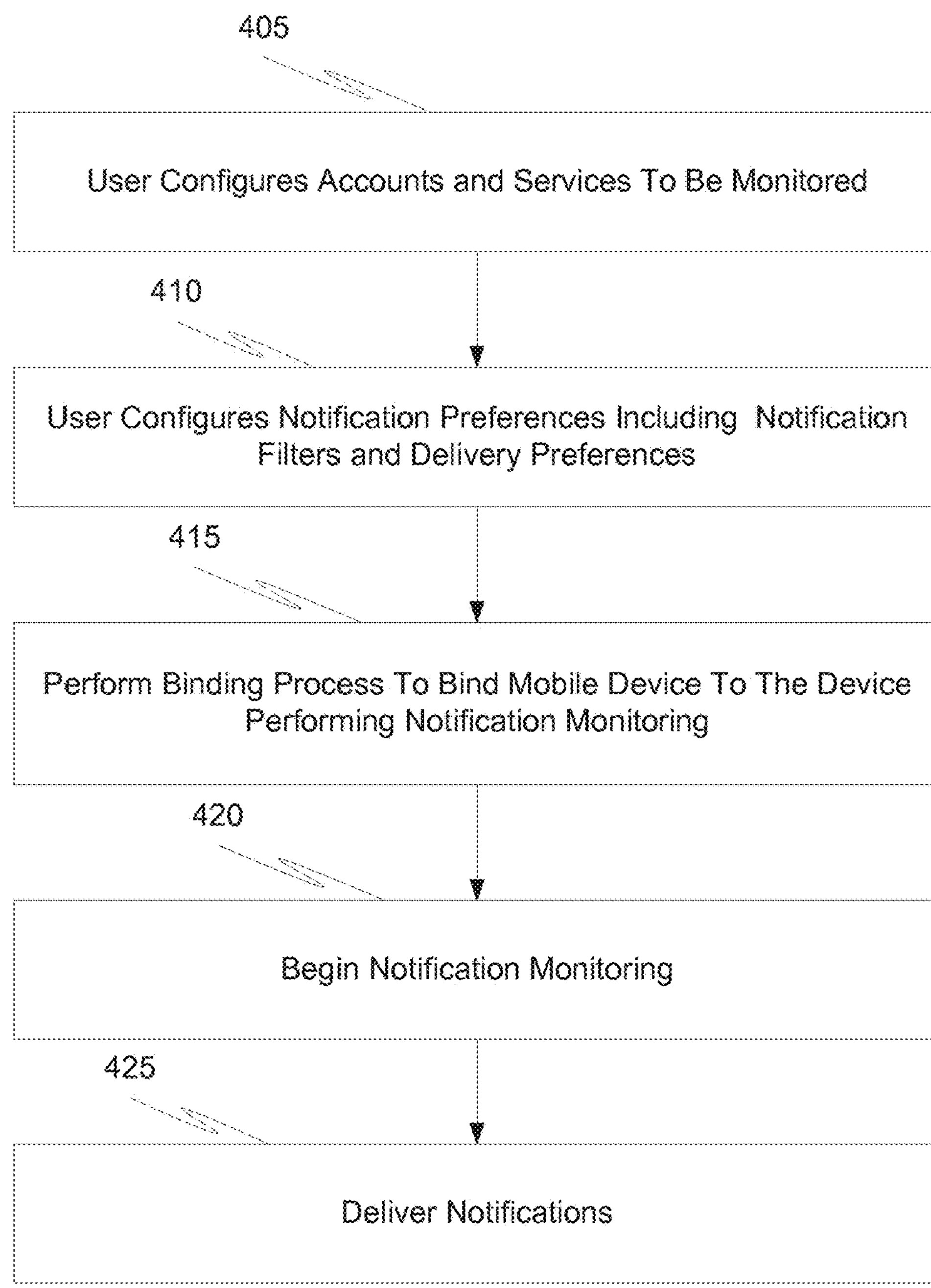
FIG. 4 is a flowchart illustrating a method in accordance with an embodiment of the present invention.

Referring to FIG. 4, the following steps are involved in the system operation at the mobile device and the home PC/server, according to a preferred embodiment.

In step 405, the user utilizes the configuration tool to configure accounts and services to be monitored. For example, the user may have one or more different email accounts, one or more social networking services, such as Facebook®, Twitter®, RSS, and email, although it would be understood that other services and/or new services could be supported. The user configures accounts/services to be monitored for notification through the configuration tool, either on the home PC or the mobile device. Irrespective of which device the user uses to configure notification preferences, the other device is kept in sync. An alternate option is to retrieve user account information from corresponding applications on the mobile device, such as a Facebook® application on the mobile device.

In step 410, the user then configures notification preferences through the configuration tool, either on the home PC or the mobile device. Irrespective of which device the user uses to configure notification preferences, the other device is kept in sync. An alternate option is to retrieve user account information from corresponding applications on the mobile device (such as a Facebook® application on the mobile device). Examples of notification preferences include the following:

1) notification filters (such as filters including rules based on keywords, type, source of notification and frequency of notifications that the user is interested to receive on his mobile device); and
2) delivery preferences (regarding how notifications should be delivered to the mobile device, for example, if they should be pushed to the device, or pulled by the device, and what kind of action should be taken when delivered. For example, if the phone should vibrate, beep, play a ringtone, or just display the unread notification).

In step 415, a binding process is performed to bind the mobile device to the PC. Using the configuration tool on the home PC, the user enters information about his mobile device and binds (establishes a connection between) the monitor on the PC and viewer on the mobile device. Several other approaches can be employed to bind the PC with the mobile device. One approach is to use a Quick Response (QR) code based data exchange protocol. Another alternative is Near Field Communication (NFC) technology.

In step 420, the notification monitor starts monitoring the different accounts, as configured by the user, for notifications/unread updates. When notifications are received or detected, the notification monitor aggregates and prioritizes notifications, according to the user's filters.

In step 425, notifications are delivered to the user's mobile device, according to the user's preferences. In one preferred embodiment, there are two options that the user can choose from:

1) Push: in a push option, the notification monitor pushes notifications to the notification viewer, as and when notifications become available; and
2) Poll: in a poll option, the notification viewer on the mobile device polls the notification monitor at regular intervals, as specified by the user, for new notifications.

In a preferred embodiment, there are several options that the user can choose from, such as: vibrate, beep, display, beep and display, vibrate and display, or none.

As an illustrative example, suppose that the user has several email accounts and subscribes to social networking services such as Twitter® and Facebook®. Conventionally, there is no practical way in the prior art for a user to set preferences to filter all of the aggregate notifications coming to their mobile device from the different accounts and services. This can result in an information overload of different notifications from different services and accounts which are hard for the user to manage. In contrast, the present invention permits a user to configure preferences globally for all of their accounts and services so that they receive notifications that they are interested in, and notifications that are less relevant are filtered out or given a lower priority based on the user's preferences.

The customizable notification system 100-A provides various benefits. In implementations in which the notification monitor is on an external device, the system monitors notifications on the user's behalf without consuming resources on the user's mobile device. The logic for detecting service state and generating notification events is moved off the device to the host PC. What remains is an application on the mobile device with a notification viewer application, with a small foot print that communicates with the home PC. Additionally, the communications overhead and power consumption on the mobile device is low. The notification viewer application only needs to communicate with a single endpoint, the home PC or home server. This reduces communications overhead when compared to solutions where the mobile device polls all services from which notifications are generated. Additionally, from the standpoint of a mobile network operator, the system harnesses resources of the mobile user (e.g., a home PC) to provide notification services, and thereby doesn't contribute to any additional operational costs for the mobile network operator.

The system 100-A provides an integrated and customized view of notifications to the user, based on their preferences. Users can configure rules for the types of notifications to be monitored and how to notify them on their mobile devices. Users can set filters to customize the types of notifications the user receives; customize the frequency of notifications the user receives; customize how they wish to be alerted when new notifications are received; and customize how notifications are delivered to their mobile device.

By providing an aggregated view of notifications (combining different types of notifications into a single, consistent view), and further customizing the priority (for example, order in the list) and actions taken for each notification type, the system enables a personalized and efficient way for users to browse through notifications.

Simple configuration: the system 100-A uses "Quick Response" images to configure the mobile/host connection. The user will not have to enter security keys or account information. However, QR image decoding is sensitive to camera handling and lighting.

The system 100-A supports identifying/forwarding notifications for a variety of data/services, and is further extensible (it is not restricted to any pre-defined set of data/services and is not dependent on the capability of the home PC).

While the invention has been described in conjunction with specific embodiments, it will be understood that it is not intended to limit the invention to the described embodiments. On the contrary, it is intended to cover alternatives, modifications, and equivalents as may be included within the spirit and scope of the invention, as defined by the appended claims. The present invention may be practiced without some or all of these specific details. In addition, well known features may not have been described in detail to avoid unnecessarily obscuring the invention.

In accordance with the present invention, the components, process steps, and/or data structures may be implemented using various types of operating systems, programming languages, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device.

What is claimed is:

1. A customizable notification system for a mobile device, comprising:

a processor; and a memory storing instructions that when executed by the processor cause the processor to perform operations including:

monitoring a plurality of different services and accounts for notifications based on user preferences configured by a user of the mobile device, wherein the user preferences include notification filters and delivery preferences;

prioritizing the notifications into an ordered list of a single view and aggregating notifications from different accounts of a service, based on the notification filters; and providing the single view to the mobile device for display;

wherein redundant notifications from different sources are filtered out of the notifications based on the user preferences, and each redundant notification comprises a portion of content that is identical to another portion of content included in the single view.

2. The system of claim 1, wherein the operations further include:

delivering at least one of the notifications to the mobile device based on the delivery preferences.

3. The system of claim 1, wherein prioritizing the notifications further comprise:

filtering the notifications based on preferences of sources of the notifications.

4. The system of claim 1, wherein:

the customizable notification system is disposed on a computing device external to the mobile device;

the mobile device is binded to the computing device such that the computing device remotely performs notification monitoring for the mobile device;

the computing device comprises a data cache for maintaining the user preferences; and at least a portion of the user preferences maintained in the data cache of the computing device are synchronized with the mobile device.

5. The system of claim 1, wherein the operations further include:

providing a configuration tool for user configuration of the user preferences.

6. The system of claim 1, wherein:

the notifications comprise at least one of an email notification, an instant messaging notification, a Real Simple Syndication (RSS) notification, a social network notification, or a combination thereof.

7. The system of claim 1, wherein:

the notification filters include rules based on at least one of keywords, type of notification, source of notification and frequency of notification, or a combination thereof for filtering and prioritizing notifications; and the delivery preferences identify, for each notification, whether the notification is delivered to the mobile device by one of pushing the notification to the mobile device or pulling the notification by the mobile device, and an alert action that is performed on the mobile device upon delivery of the notification to the mobile device.

8. The system of claim 1, wherein the operations further include:

filtering the notifications based on the user preferences to filter out the redundant notifications.

9. A mobile device comprising:

a processor; and a memory storing instructions that when executed by the processor cause the processor to perform operations including:

retrieving user preferences comprising filter preferences and delivery preferences;

aggregating, based on the filter preferences, notifications from different accounts of a service, wherein the notifications are from a plurality of services and accounts of a user of the mobile device; and displaying the aggregated notifications on the mobile device based on the delivery preferences;

wherein redundant notifications from different sources are filtered out of the notifications based on the filter preferences, and each redundant notification comprises a portion of content that is identical to another portion of content included in the aggregated notifications.

10. The mobile device of claim 9, wherein the notifications comprise at least one of an email notification, an instant messaging notification, a Real Simple Syndication (RSS) notification, a social network notification, or a combination thereof.

11. The mobile device of claim 9, wherein the operation further include:

providing a configuration tool for user configuration of the user preferences.

12. The mobile device of claim 9, wherein:

the filter preferences include rules based on at least one of keywords, type of notification, source of notification, frequency of notification, or a combination thereof for filtering and prioritizing notifications;

the delivery preferences identify, for each notification, whether the notification is delivered to the mobile device by one of pushing the notification to the mobile device or pulling the notification by the mobile device, and specify an alert action to be taken on the mobile device upon delivery of the notification to the mobile device, the alert action comprising one or more of the following: vibrate, beep, play a ringtone, and displaying the notification; and the operations further include:

filtering and prioritizing the notifications based on the filter preferences; and delivering the notifications based on the delivery preferences.

13. The mobile device of claim 9, wherein the notifications are combined to form a single consistent view.

14. A method comprising:

at a system including at least one processor:

retrieving user preferences comprising filter preferences and delivery preferences;

aggregating, based on the filter preferences, notifications from different accounts of a service, wherein the notifications are from a plurality of services and accounts of a user of a mobile device; and displaying the aggregated notifications on the mobile device based on the delivery preferences;

wherein redundant notifications from different sources are filtered out of the notifications based on the filter preferences, and each redundant notification comprises a portion of content that is identical to another portion of content included in the aggregated notifications.

15. The method of claim 14, wherein the notifications comprise at least one of an email notification, an instant messaging notification, a Real Simple Syndication (RSS) notification, a social network notification, or a combination thereof.

16. The method of claim 14, further comprising:

providing a configuration tool for user configuration of the user preferences.

17. The method of claim 14, wherein:

the filter preferences include rules based on at least one of keywords, type of notification, source of notification, frequency of notification, or a combination thereof for filtering and prioritizing notifications; and the delivery preferences identify, for each notification, whether the notification is delivered to the mobile device by one of pushing the notification to the mobile device or pulling the notification by the mobile device, and specify an alert action to be taken on the mobile device upon delivery of the notification to the mobile device, the alert action comprising one or more of the following: vibrate, beep, play a ringtone, and displaying the notification.

18. The method of claim 14, further comprising:

filtering and prioritizing the notifications based on the filter preferences; and delivering the notifications based on the delivery preferences.

19. A non-transitory processor-readable medium that includes a program that when executed by a processor performs a method comprising:

retrieving user preferences comprising filter preferences and delivery preferences;

aggregating, based on the filter preferences, notifications from different accounts of a service, wherein the notifications are from a plurality of services and accounts of a user of the mobile device; and displaying the aggregated notifications on the mobile device based on the delivery preferences;

wherein redundant notifications from different sources are filtered out of the notifications based on the filter preferences, and each redundant notification comprises a portion of content that is identical to another portion of content included in the aggregated notifications.

20. The non-transitory processor-readable medium of claim 19, wherein the notifications comprise at least one of an email notification, an instant messaging notification, a Real Simple Syndication (RSS) notification, a social network notification, or a combination thereof.

* * * * *